United States Patent [19]

Kust

[11] 4,149,945
[45] Apr. 17, 1979

[54] HYDROMETALLURGICAL BRASS DUST RECLAMATION

[75] Inventor: Roger N. Kust, Acton, Mass.

[73] Assignee: Kennecott Copper Corporation, New York, N.Y.

[21] Appl. No.: 895,919

[22] Filed: Apr. 13, 1978

[51] Int. Cl.² ...................... C22B 15/12; C22B 19/22
[52] U.S. Cl. ................................ 204/119; 75/101 R;
75/109; 75/117; 75/120; 204/115; 423/36;
423/99
[58] Field of Search .................. 204/119, 115; 75/117,
75/101 R, 120, 109; 423/36, 99

[56] References Cited

U.S. PATENT DOCUMENTS

| | | | |
|---|---|---|---|
| 2,509,918 | 5/1950 | Griffith et al. | 75/120 |
| 3,691,038 | 9/1972 | von Roepenack et al. | 75/120 X |
| 3,826,648 | 7/1974 | Bodson | 75/109 |
| 3,905,808 | 9/1975 | Bzura | 75/101 R |
| 3,933,478 | 1/1976 | Moore | 75/115 X |
| 3,985,857 | 10/1976 | Menendez et al. | 423/106 |
| 3,994,721 | 11/1976 | Bienvenu et al. | 75/109 |
| 4,071,421 | 1/1978 | Masters et al. | 204/119X |

Primary Examiner—G. Ozaki
Attorney, Agent, or Firm—John L. Sniado; Anthony M. Lorusso

[57] ABSTRACT

A process for winning copper and zinc from brass mill waste products containing oxidic copper and zinc, iron, nickel, or cobalt. The feed material is leached in sulfuric acid, neutralized to a pH between about 2.5 and 3.0, and treated with zinc metal to precipitate copper. After separation of the copper product, residual copper as well as iron and cobalt are removed in a second, oxygen-free, cementation on zinc metal. The liquor is then raised to about pH 4.0 or greater and flushed with oxygen to precipitate iron. Lastly, the purified electrolyte is subjected to zinc electrowinning wherein acceptably pure zinc cathode is produced and sulfuric acid is regenerated.

5 Claims, 3 Drawing Figures

HYDROMETALLURGICAL BRASS DUST RECLAMATION

BACKGROUND OF THE INVENTION

This invention relates to a process for recovering zinc and copper values from material containing significant quantities of zinc and copper oxides. More particularly, it relates to a hydrometallurgical process wherein greater than 90% of the copper and zinc present in the feed material is separated and recovered as acceptably pure metal.

In current zinc hydrometallurgical practice, zinc metal is recovered by electrowinning. Because of the relatively high position of zinc in the electromotive series, the concentration of metals such as cobalt, cadmium, nickel, copper, and iron in the zinc bearing solution must be quite low if an acceptably pure zinc product and a reasonable current efficiency are to be achieved. The presence of cobalt or nickel in the electrolyte lowers current efficiency in electrowinning and results in resolubilization of the cathode deposit; cadmium contaminates the zinc product; and iron, like cobalt and nickel, seriously lowers the current efficiency. To achieve reasonable economy in a zinc electrowinning system, the cobalt and nickel concentrations should be no greater than about 0.5 to 1.0 mg/l, the iron content should be less than about 20 mg/l, and cadmium should be present in concentrations no greater than about 50 mg/l.

The typical zinc-containing feed material used in the zinc hydrometallurgical-electrowinning process is a zinc oxide, iron containing calcine (e.g., $ZnO.Fe_2O_3$) produced by roasting the raw ore and containing trace amounts of copper, cobalt, cadmium, and other metals. As disclosed, for example, in U.S. Pat. No. 3,985,857 to Menendez et al. entitled *Process fo Recovering Zinc from Ferrites*, and U.S. Pat. No. 3,994,721 to Bienvenu et al. entitled *Purifying A Zinc-Bearing Solution by Cementation*, the approach to winning zinc from this type of ore involves subjecting it to a hot acid leach to solubilize the metal values. After separating any acid insoluble residue from the leach liquor, the leach liquor is neutralized to a pH in the vicinity of 4–5 to precipitate impurities such as iron, nickel, and copper as insoluble hydrated oxides or hydroxides. This step is then followed by a cementation process wherein zinc metal dust is added to the leach liquor to precipitate metals remaining in solution which are more noble than zinc, such as cobalt and cadmium. The zinc values in the leach liquor may then be efficiently electrowon as an acceptably pure product in accordance with the reaction:

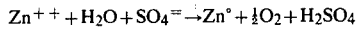

$$Zn^{++} + H_2O + SO_4^= \rightarrow Zn^\circ + \tfrac{1}{2}O_2 + H_2SO_4$$

Advantageously, the sulfuric acid produced as a by-product may be used to solubilize additional quantities of roasted ore.

The foregoing technique is well suited for recovering zinc from ores containing quantities of copper too low to justify recovery. However, if materials of high copper concentration, e.g., brass factory dust, is sought to be treated, the foregoing technique is unsuitable because copper present in the leach liquor is precipitated as copper oxide or hydroxide together with the iron jarosites or hydroxides in the neutralization step and is lost or made more difficult to recover. An economical process for recovering zinc and copper from materials containing admixtures of copper and zinc oxide, iron values, and other metals must be capable of recovering substantial quantities of acceptably pure copper substantially uncontaminated by nickel, cobalt, iron, or zinc. Furthermore, the process should result in a zinc bearing leach liquor containing metallic contaminants no greater than the levels set forth above so that zinc cathodes of acceptable purity may be electrowon at reasonable current efficiencies.

SUMMARY OF THE INVENTION

The process of the instant invention is specifically designed to achieve the foregoing goals employing brass mill wastes such as baghouse dust and the like as a feed material. However, it should be noted that the process of the invention is not limited to this particular type of feed material, but rather is useful for recovering zinc and copper from any material containing substantial quantities of zinc oxide and copper oxide, iron, and trace amounts of various other metals. At the heart of the invention is the discovery that copper of acceptable purity may be selectively removed from aqueous acidic $Cu^{++}$, $Zn^{++}$, $Fe^{++}$, $Ni^{++}$, and $Co^{++}$ containing solutions by cementation on zinc metal without the build-up of dangerous levels of hydrogen gas if certain parameters of the cementation reaction are controlled as disclosed herein. Thus, the invention enables the cementation of most of the copper metal in solution to the substantial exclusion of nickel, cobalt, and zinc and without simultaneously precipitating iron. This technique is incorporated into an overall copper and zinc recovery system well suited for brass dust reclamation.

Broadly, the process of the invention comprises the steps of leaching the feed material in an aqueous sulfuric acid leach liquor having a pH less than 2.0, typically less than 1.0, under conditions suitable for optimizing the solubilization of copper and zinc values. Since many brass dust waste products include substantial quantities of cuprous oxide or reduced metals, it is preferred to conduct the leach in the presence of oxygen. A zinc oxide containing material is then added to the leach liquor to increase its pH to a value within the range of about 2.5 to 3.5, preferably 2.5 to 3.0. Next, zinc metal is added to the leach liquor to precipitate copper values by cementation. At the pH range involved, and especially if shredded zinc cathode or other zinc metal having a relatively low surface area to mass ratio (as opposed to zinc dust) is employed for this step, the production of hydrogen as a result of the reaction of acid with zinc metal is minimized. In this pH range copper hydroxide precipitation and nickel cementation are avoided, and the iron remains in solution. The pH of the copper bearing leach liquor is then increased to a level on the order of 4.5, preferably by the addition of zinc oxide, and the iron values are precipitated as jarosites or hydroxides. Lastly, the purified zinc bearing leach liquor is subjected to electrowinning to produce zinc cathode.

In preferred embodiments, the feed material comprises brass mill waste products containing significant amounts of oxidized copper and oxidized zinc, trace amounts of iron, and either or both nickel and cobalt. This preferred feed material may also be used as the zinc oxide containing material employed in the neutralization step, in which case any remaining unleached metal values can conveniently be added to the low pH leaching step for recovery. With feed materials containing the foregoing metals, it is important both that the nickel and cobalt concentration be reduced generally below about 1 mg/l prior to zinc electrowinning and that the copper cement be substantially uncontaminated with nickel or cobalt. To achieve these goals, cementation is effected in two stages.

In the first stage, coarse zinc metal scrap or shredded cathode is used in slight stoichiometric excess to cement substantially pure copper. In the second stage all metals more noble than zinc including cobalt and nickel and residual copper values are cemented on a large stoichiometric excess of zinc dust. During this cementation, oxygen is excluded from the leach liquor so that its ferrous ion content is not oxidized. By this treatment, the concentration of metal values other than iron are reduced to levels suitable for zinc electrowinning.

The pH of the leach liquor is then raised by the addition of zinc oxide, and as an oxygen containing gas is sparged through the leach liquor, its iron concentration is greatly reduced as an iron containing precipitate is formed in a known manner. Conventional zinc electrowinning follows, wherein acid is regenerated.

Accordingly, it is an object of the invention to provide a hydrometallurgical process for recovering both zinc and copper values from a variety of zinc and copper oxide containing materials, especially brass mill byproducts.

Another object of the invention is to provide a hydrometallurgical zinc recovery process designed for treating feed materials containing substantial quantities of copper wherein zinc cathodes of acceptable purity are produced at reasonable current efficiencies.

Another object of the invention is to recover copper from materials containing copper oxide, zinc oxide, and nickel, cobalt, and iron without substantially contaminating the copper product.

These and other objects and features of the invention will be apparent from the following description of a preferred embodiment and from the drawing.

DESCRIPTION OF THE PREFERRED EMBODIMENT

Figure 2:
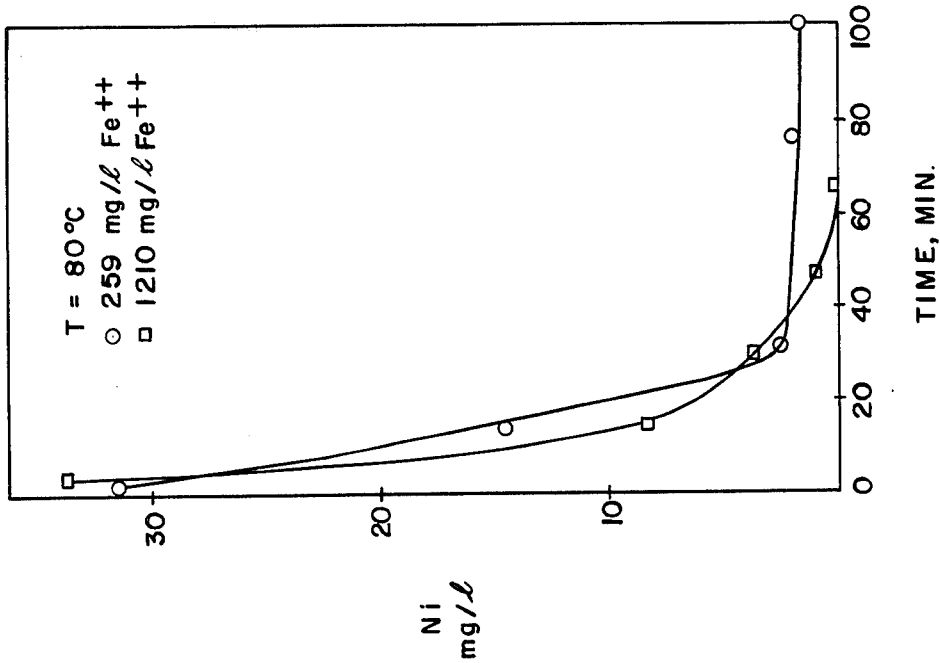
FIG. 2 is a graph showing the rate of cementation of nickel conducted in accordance with the invention in the presence of different amounts of ferrous iron.

At the outset the invention will be described in its broadest overall aspects with a more detailed description following.

The feed material for which the process of the instant invention is primarily designed comprises waste products of brass mills such as cyclone and baghouse dust. The metal content of these materials differs somewhat depending on the source of the material, but significant quantities of zinc oxide and copper oxide, small quantities of iron, and trace but important concentrations of cobalt and/or nickel are uniformly present. A representative composition profile of three classes of brass factory waste material, segregated on the basis of particle size, is set forth in Table I below. This data is presented only as an example of the type of feed material which can be used in the process of the invention, and it will be apparent that the composition of the feed material may vary widely within the limits noted herein.

Table I

Semiquantitative Mass Spectrographic Analyses for selected metals in coarse, fines, and dust fractions of Brass dust. (Values in ppm by Weight)

| Element | Coarse | Fines | Dust |
|---|---|---|---|
| B | 50 | 85 | 50 |
| Na | 1070 | 1070 | 1070 |
| Mg | 1115 | Major | 3720 |
| Al | Major | Major | Major |
| Si | Major | Major | Major |
| K | Major | Major | 1815 |
| Ti | 95 | 335 | 95 |
| Cr | 160 | 405 | 200 |
| Mn | 2560 | 1705 | Major |
| Fe | 2170 | 2170 | 2170 |
| Co | 2 | 25 | 5 |
| Ni | 25 | 180 | 25 |
| Cu | Major | Major | Major |
| Zn | Major | Major | Major |
| Pb | Major | Major | Major |

It was determined that none of the foregoing fractions contained measureable amounts of metallic zinc, indicating that hydrogen evolution of a magnitude approaching the danger point would not be a problem in the acid leach. However, it is expected that the metallic zinc content of such materials will vary with the source. Accordingly, the possible dangerous build-up of hydrogen should be ascertained in advance. Some feed materials may be required to be roasted to oxidize any metallic zinc prior to leaching. X-ray diffraction analysis of the foregoing materials indicates that the dominant copper phase is cuprous oxide, $Cu_2O$. The zinc-to-copper ratio increases from 1.2 in the "coarse" fraction to about 5.0 in the "dust" fraction.

The feed material is first leached in hot aqueous sulfuric acid having a pH less than 2, preferably less than 1. The leach will normally be conducted with aeration so that all copper present is oxidized to the cupric state. However, where the feed material has been preroasted, aeration is not necessary. Zinc and copper are solubilized with sulfate as the counter ion in accordance with known reactions such as:

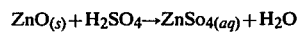

$$ZnO_{(s)} + H_2SO_4 \rightarrow ZnSO_{4(aq)} + H_2O$$

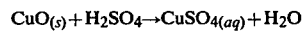

$$CuO_{(s)} + H_2SO_4 \rightarrow CuSO_{4(aq)} + H_2O$$

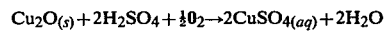

$$Cu_2O_{(s)} + 2H_2SO_4 + \tfrac{1}{2}O_2 \rightarrow 2CuSO_{4(aq)} + 2H_2O$$

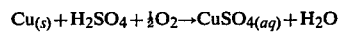

$$Cu_{(s)} + H_2SO_4 + \tfrac{1}{2}O_2 \rightarrow CuSO_{4(aq)} + H_2O$$

Experiments have demonstrated that, at 80° C. and pH<1.0, 99.5% of the copper and 95.4% of the zinc in the feed marterial can be solubilized. Zinc is solubilized more rapidly than copper but not as completely. X-ray diffraction analysis of the feed material suggests that some of the zinc is present as a zinc aluminate which is essentially insoluble under the conditions set forth above. Prior to transferring the liquor to the next stage, the insoluble residue containing silicates, aluminates, and the like is separated by known techniques.

The neutralization step is effected by adding to the leach liquor a zinc oxide containing material, preferably feed material. The hydrogen ion concentration is decreased, and thus the pH is increased, as a consequence of the reaction:

$$2H^+ + ZnO \rightarrow H_2O + Zn^{++}$$

If, as preferred, the feed material is employed in this neutralization step, between about 60% and 80% of the zinc but only trace amounts of copper are solubilized. Accordingly, the solids which remain after the desired pH is reached are removed and fed to the acid leach described above to solubilize the remaining copper.

In prior art zinc winning procedures, the pH of the electrolyte is raised at this point to about 4.5 or above to precipitate iron. If small quantities of copper are present in the electrolyte, they either precipitate along with the iron or are removed together with other metals in a subsequent cementation step. When, as here, the feed material contains copper in recoverable amounts, it is obvious that this process results in recovery of a copper product heavily contaminated with iron and other impurities. However, in accordance with the invention, it has been discovered that substantially pure copper may be recovered if the pH is controlled within the range of 2.5–3.5, preferably 2.5–3.0, and zinc metal is added to the leach liquor prior to precipitating iron.

Below about pH 2.5, the generation of large amounts of hydrogen by reaction between acid and zinc is difficult to avoid. Above about pH 3.5, copper and other hydroxides precipitate spontaneously. However, within this critical pH range, a substantially pure copper product can be cemented on zinc, and the copper concentration of the solution can be decreased to a level below about 1.0 g/l. Nickel and cobalt are not cemented in appreciable amounts under these conditions. When a 10% molar excess of 30 mesh zinc (based on the amount of copper present) is added to a leach liquor at pH 2.5, two reactions occur:

$$Zn^\circ + Cu^{++} \rightarrow Cu^\circ + Zn^{++}$$

$$2Fe^{+++} + Zn^O \rightarrow 2Fe^{++} + Zn^{++}$$

If only a slight molar excess of zinc is used (e.g., no greater than 10%–15%), substantially only copper is cemented.

Figure 1:
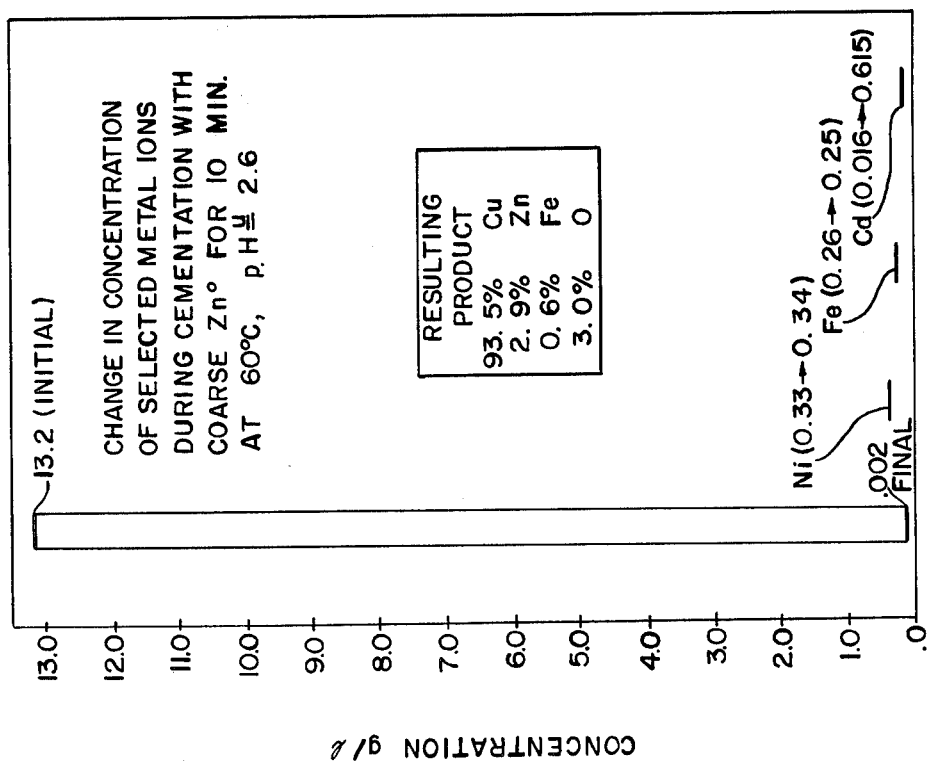
FIG. 1 is a graph of metal ion concentration in a sulfuric acid leach liquor before and after zinc cementation conducted in accordance with the invention which illustrates the selectivity of copper precipitation.

FIG. 1 graphically illustrates the selectivity of this reaction under the conditions disclosed herein. A three liter reactor containing an $H_2SO_4$ liquor (pH≈2.6) loaded with 13.2 g/l Cu, 0.26 g/l Fe, 0.33 g/l Ni, 0.016 g/l Cd, and 136.0 g/l Zn was treated with a 10% molar excess (based on copper) of 30 mesh zinc for 10 minutes with agitation. As a result of this treatment, the copper concentration in solution was decreased to about 0.002 g/l while the other metal concentrations remain substantially constant. The cemented product contained 93.5% copper, 2.9% Zn, 0.6% iron, and 3.0% oxygen.

Experiments indicate that in the presence of oxygen, ferrous ion generated during the course of the cementation reaction is oxidized to ferric ion. This in turn can react with the cemented copper to induce resolubilization. Accordingly, while copper cementation occurs even in the presence of oxygen, it is much preferred to conduct this cementation in an oxygen-free environment to promote efficient use of the zinc metal and high copper yields.

Another aspect of this step of the process of the invention is that it is advantageously effected with a zinc metal having a relatively low surface area to mass ratio. Thus, the commonly used powdered zinc is preferably replaced by at least coarse metal particles, e.g., on the order of 30 mesh or larger. Shredded zinc cathode is even more preferred. The reason for using low surface area zinc is to suppress a zinc surface area dependent side reaction which results in the production of hydrogen and in the consumption of zinc:

$$Zn^\circ + 2H^+ \rightarrow Zn^{++} + H_2 \uparrow$$

In the next step of the process of the invention, residual copper and nickel, cobalt, or cadmium present in the leach liquor is removed by a second cementation step. This step may be entirely eliminated if the feed material is nickel and cobalt free. However, nickel and cobalt are particularly troublesome impurities in zinc electrolytes, and accordingly their concentrations should be decreased to less than about 1.0 mg/l and preferably to less than about 0.1 mg/l if high current efficiency and a quality zinc product are to be obtained. In accordance with the invention, successful operation of this cementation step depends on the presence of substantial quantities of ferrous ion in the leach liquor together with the nickel, cobalt, and/or cadmium values to be removed and on using large molar excesses of zinc. Oxidizing agents such as air must be excluded from the reactor to preserve $Fe^{++}$, which behaves catalytically. If the feed material does not contain iron in significant concentration as a naturally occurring impurity, in some situations it may be added to effect the desired cementation.

In this regard, experiments have been conducted wherein nickel cementation was attempted both with and without ferrous ion. In an experiment using a solution containing 104 mg of nickel per liter but no iron, after 100 minutes, 43 milligrams per liter nickel remained despite the addition of 2.4 grams of zinc dust, that is, about 25 times the zinc required to theoretically reduce all nickel. However, when the experiments are repeated with identical solutions except for the presence of ferrous ion, nickel cementation is distinctly improved. Representative results from these experiments are graphically illustrated in FIG. 2. As shown, when the ferrous content of the leach liquor is 259 mg.l, after 100 minutes, the nickel concentration is decreased to approximately 1.5 mg/l. In a leach solution containing 1210 mg/l ferrous iron, the nickel level is reduced below the 1 mg/l level in just 60 minutes. In these experiments, the amount of zinc used was approximately 10 times the stoichiometric amount necessary to reduce all nickel, cobalt, cadmium, residual copper, and iron present in the solutions.

The nature of the chemical reaction occurring in this step is not well understood, but it seems most likely that the ferrous ion acts as an oxygen scavenger. Removal of dissolved oxygen has been observed to prevent redissolution of the cemented nickel metal. Further experiments indicate that the cobalt concentration is also significantly lowered by this treatment, in some cases below the 1 mg/l level. Preferred reaction conditions are a ferrous ion concentration between approximately 0.25 and 1.2 g/l, and a pH between about 2.5 and 3.5, preferably 3–3.5 as measured at 25° C.

The last step in purifying the zinc bearing leach liquor is to remove the iron by precipitation. The iron is precipitated as a hydrated ferric oxide, $Fe_2O_3 \cdot nH_2O$, or as a jarosite. Precipitation is induced by increasing the pH of the solution, and begins between 3.0 and 3.5. Precipitation is typically complete at a pH in the vicinity of 4.5 (measured at 90° C.). Since the precipitation of the iron depends on the presence of ferric ions, it is preferred to sparge liberal quantities of oxygen through the leach liquor. In fact, iron precipitation can be initiated as desired by controlling the quantity of oxygen available in the solution. However, a competing reaction, specifically:

$$2Fe^{++} + \tfrac{1}{2}O_2 + 2H_2O \rightarrow Fe_2O_3 + 4H^+$$

results in the production of hydrogen ions which of course lowers the pH. The effect of the side reaction is that iron precipitation cannot be forced to completion using only oxygen sparging. Accordingly, it is necessary to adjust the pH to a level above about 4.0. While numerous bases could be added to effect this neutralization, it is preferred to add zinc oxide which reacts with the ferrous iron and oxygen to produce ferric oxide precipitate in accordance with the following reaction:

$$2Fe^{++} + \tfrac{1}{2}O_2 + 3ZnO \rightarrow Fe_2O_3 \downarrow + 3Zn^{++}$$

Zinc oxide is preferred (the purer the better) because it does not involve the addition of a new species to the leach liquor. Preferably, a two fold molar excess of zinc oxide is added, based on the moles of iron present in the solution. This requires the addition of about 4.4 g ZnO per gram of iron.

The last step of the process of the invention is the conventional step of electrowinning zinc. Current efficiencies of greater than 85% are easily achievable in this step since the copper, nickel, and cobalt concentration of the pregnant liquor are below 1 mg/l, and the iron content is below 20 mg/l. Zinc metal plates out and sulfuric acid is produced as a byproduct in accordance with the reaction:

$$Zn^{++} + SO_4^{=} + H_2O \rightarrow Zn° \downarrow + 2H^+ + SO_4^{=} + \tfrac{1}{2}O_2 \uparrow$$

A portion of the zinc may be shredded and used in the copper cementation step. The sulfuric acid produced may be delivered to the acid leach.

Figure 3:
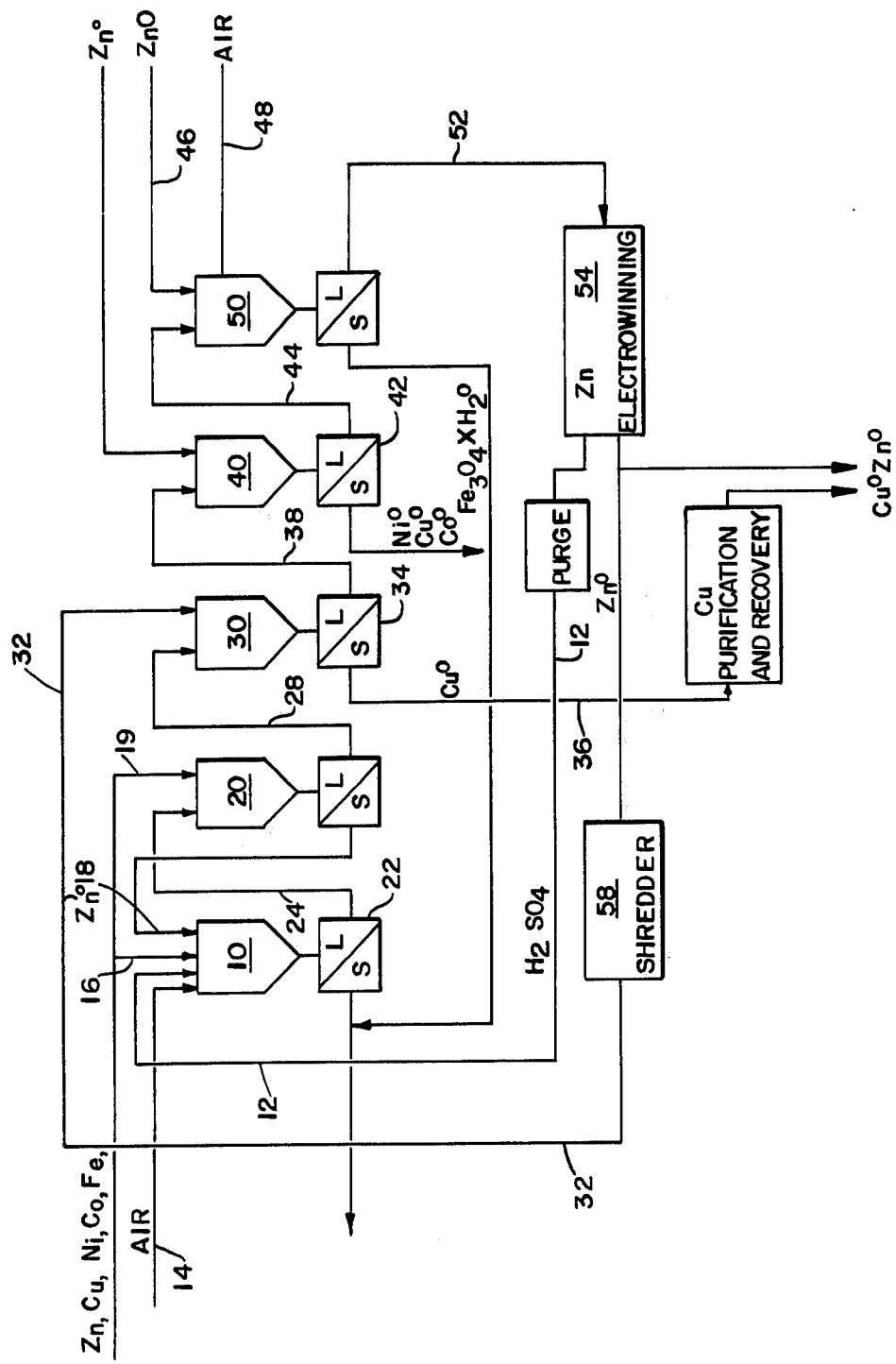
FIG. 3 is a schematic diagram illustrating one overall copper and zinc recovery procedure embodying the invention.

Referring to FIG. 3, a schematic diagram illustrating an overall process for recovering zinc and copper from brass mill waste products is shown. Acid leach tank 10 is serviced by aqueous sulfuric acid solution line 12 and air line 14, and is provided with feed material from lines 16 and 18. The pH of the solution from line 12 is below 1.0. Zinc oxide, cupric and cuprous oxides, and small quantities of oxidic iron, nickel, and cobalt material from line 16 react in tank 10, for example, at 80° C., resulting in a $Zn^{++}$, $Cu^{++}$, $Fe^{+++}$, $Ni^{++}$, and $Co^{++}$ sulfate solution. The solids from line 18 are similar to those in line 16, except that the zinc oxide content is reduced as a consequence of the neutralization reaction taking place in leach tank 20.

After the unleachable solids are removed in liquid-solid separator 22, the leach liquor is delivered to neutralization leach tank 20 via line 24. In tank 20, the pH of the liquor is raised to between 2.5 and 3.0 by acid consuming reaction with zinc oxide, and to a lesser extent, copper oxide, both introduced via line 19. Since significant quantities of the metal values of interest remain as solids in this pH range, after attaining the desired pH, the solid residue is delivered to tank 10 via line 18 for further leaching. The pregnant, pH controlled leach liquor is then delivered to copper cementation reactors 30 via line 28.

The cementation reactor 30 is serviced with a zinc metal feed line 32 which transports shredded zinc cathode for reaction with the copper values in the liquor. When a 10% molar excess (relative to copper content) of zinc is used, a pH within the range of 2.5–3.0 is present, and the zinc employed is a relatively low surface area to mass ratio material (i.e., as opposed to a fine powder), hydrogen evolution is kept to a minimum, essentially no nickel, cobalt, or iron precipitates out, the precipitation of copper hydroxide is avoided, and greater than 90% of the copper values are recovered as an acceptably pure cemented product. Oxygen is excluded from reactor 30.

The cemented copper is separated from the other solubilized metal values in liquid solid separator 34, and delivered through line 36 for repulping, redissolving, electrowinning, or other conventional treatment designed to purify and recover copper. The substantially copper barren leach liquor is delivered through line 38 to cementation reactor 40.

In reactor 40, zinc dust is added, preferably in substantial molar excess of that required to cement all nickel, cobalt, iron, residual copper and other metals more noble than zinc which remain in the leach liquor. In the presence of ferrous iron, nickel and cobalt levels are decreased to about 1.0 mg/l or less, and the concentration of other cementable metals is suitably reduced.

After separating the solids in liquid-solid separator 42, the iron and zinc containing liquor is delivered through line 44 to iron precipitator 50. Zinc oxide (free of impurities which would contaminate the leach liquor) is introduced via line 46 to the leach liquor to raise the pH to levels at which iron values precipitate as oxides, hydroxides, or jarosites. Air is introduced via line 48 to facilitate oxidation of iron to the ferric state. A typical pH range for this precipitation is between 4.0 and 5.0.

The now purified leach liquor is then delivered via line 52 to zinc electrowinning cells 54 where zinc is plated out and sulfuric acid manufactured in a manner known per se. After purging the zinc barren electrolyte (if necessary), the acid byproduct is delivered via line 12 to reactor 10. A portion of the zinc cathode is shredded at 58, and used to precipitate copper in reactor 30.

The operability of all of the foregoing process steps has been demonstrated by numerous laboratory experiments, nonlimiting examples of which appear below.

EXAMPLES

Composite brass dust, consisting of 6 parts coarse, 6 parts fine, and 1 part dust obtained from Chase Brass Company was treated in accordance with the above process description on a laboratory scale. Because no recycled electrolyte was available, a synthetic electrolyte was made. During the course of the investigation, it was decided that the zinc electrowinning step should be based on an intermediate current density of about 60 amps per square foot. Consequently, the synthetic electrolyte was made to represent the depleted electrolyte from such a process. Acid content used was 200 g/l and the zinc level was 60 g/l. Because no pre-leached brass feed was available, unleached brass dust material was added to the strong acid leach.

A. Strong Acid Leach (Leach Tank 10)

The conditions used for this step were a temperature of 80° C., 220 rpm stirring, and 750 ml/min air flow. Three hundred grams of composite feed were added to 2 liters of synthetic spent zinc electrolyte and leached for 5 hours. An analysis of the initial and final liquors and the composite feed and leached residue are given in Table II.

Table II
Simulation of Strong Acid Leach

| Element | Spent Electrolyte | Composite Feed, wt % | Residue wt % | Filtrate |
|---|---|---|---|---|
| Zn | 62.5 g/l | 42.5 | 11.0 | 134.0 g/l |
| Cu | 0.5 g/l | 25.0 | 1.64 | 44.2 g/l |
| Fe | 1.7 ppm | 0.474 | 0.528 | 733.0 ppm |
| Ni | 1.5 ppm | 0.057 | 0.058 | 90.0 ppm |
| Mn | 0.60 ppm | 0.402 | 0.252 | 631.0 ppm |
| Cl | <10.0 ppm | 0.05 | 0.10 | ≈35.0 ppm |
| Pb | 3.0 ppm | 1.33 | 6.23 | 18.0 ppm |
| Sb | <0.05 ppm | 0.0034 | 0.016 | 0.18 ppm |
| As | 0.03 ppm | 0.0051 | 0.0088 | 1.42 ppm |
| Co | 0.9 ppm | 0.005 | 0.004 | 3.6 ppm |
| Si | — | 2.58 | 12.4 | 70.0 ppm |
| Cd | 0.2 ppm | 0.0105 | 0.002 | 15.0 ppm |

Solid residue remaining after the 5 hour leach amounted to 53.8 grams; residual acid concentration was 46.6 g/l; and the final volume of liquor was 1.08 liter. The extraction of copper was 98% and the extraction of zinc was 92.4%. A vacuum filter was used to separate the liquid and solid phases. The filtration rate observed was 0.29 gals/hr/ft$^2$ through a Whatman 41 filter paper at 27" vacuum.

B. Neutralization Leach (Leach Tank 20)

Liquors from several strong acid leach reactions were combined and neutralized in approximately two-liter batches by adding the fines fraction of the brass dust feed material. The initial temperature was about 70° C., but rose to about 80° C. during the reaction. The rate of agitation was 1080 rpm. Final solution pH, after 30 minutes, was 2.5 as measured at 80° C.

Table III lists the analyses for the starting liquor, the brass fines added, the residue (after washing), and the final filtrate. Washing of the residue is necessary for analysis but would not be necessary in commercial operation.

Table III
Simulation of Neutralization Leach

| Element | Starting Liquor | Brass Fines wt % | Residue wt % | Filtrate |
|---|---|---|---|---|
| Zn | 144.0 g/l | 47.1 | 11.8 | 182.0 g/l |
| Cu | 34.0 g/l | 20.0 | 34.4 | 37.5 g/l |
| Fe | 840.0 ppm | 0.54 | 0.326 | 1,220.0 ppm |
| Ni | 88.0 ppm | 0.043 | 0.053 | 108.0 ppm |
| Mn | 720.0 ppm | 0.51 | 0.194 | 1,110.0 ppm |
| Cl | 35.0 ppm | <0.15 | 0.05 | 35.0 ppm |
| Pb | 16.0 ppm | 1.3 | 2.99 | 21.0 ppm |
| Sb | 0.23 ppm | — | 0.0046 | 0.03 ppm |
| As | 0.60 ppm | — | 0.009 | 0.66 ppm |
| Co | 4.7 ppm | — | 0.053 | 5.0 ppm |
| Si | 52.0 ppm | 4.7 | 6.43 | 67.0 ppm |
| Cd | 16.3 ppm | — | 0.002 | 26.0 ppm |

72.8 g of fines were added per liter of liquor. The residue remaining after leaching was 49.9 g/l. Seventeen percent of the copper, and 86.6% of the zinc was leached.

C. Copper Cementation (Reactor 30)

Copper was cemented from 2 liters of the neutralized liquor using zinc chips to simulate shredded zinc cathode. The chips were cut from a piece of 10 mil zinc sheet into pieces about ¼" square. 1.08 g zinc was added per gram of copper in solution. The initial temperature of the solution was 65° C. and this rose to 80° C. during the reaction. The reaction was terminated after 30 minutes by decanting off the liquor. Analyses for the starting solution, final solution, and cemented copper product are listed in Table IV.

The total mass of zinc added was 83.6 g; the cemented copper product weighed 91.2 g; and utilization of zinc was calculated as 96%.

Table IV
Cementation of Copper with Zinc Chips

| Element | Starting Liquor | Final Liquor | Cement Copper (wt %) |
|---|---|---|---|
| Zn | 182.0 g/l | 223.0 g/l | 3.15 |
| Cu | 37.5 g/l | 0.52 g/l | 86.1 |
| Fe | 1,220.0 ppm | 1,135.0 ppm | 0.016 |
| Ni | 108.0 ppm | 109.0 ppm | 0.002 |
| Mn | 1,110.0 ppm | 1,245.0 ppm | 0.008 |
| Cl | 35.0 ppm | 3.5 ppm | 0.10 |
| Pb | 21.0 ppm | 21.0 ppm | 0.082 |
| Sb | 0.03 ppm | <0.03 ppm | 0.0004 |
| As | 0.66 ppm | 0.45 ppm | 0.0039 |
| Co | 5.0 ppm | 5.0 ppm | 0.002 |
| Si | 67.0 ppm | 60.0 ppm | 0.39 |
| Cd | 26.0 ppm | 38.0 ppm | 0.013 |

D. Nickel Cementation (Reactor 40)

Two liters of copper depleted liquor were placed in a reactor which had been purged with nitrogen, zinc powder (−100 mesh) was added, and the temperature was maintained at about 80° C. for 90 minutes. Table V lists the pertinent analyses. As shown, nickel concentration was decreased to close to 1 mg/l. This is almost a satisfactory level since, after the dilution which occurs in the zinc electrowinning process, the nickel concentration will be less than 1 mg/l.

Table V
Cementation of Nickel with Zinc Dust

| Element | Starting Liquor | Final Liquor | Cement (wt %) |
|---|---|---|---|
| Zn | 219.0 g/l | 223.0 g/l | 81.8 |
| Cu | 0.51 g/l | 1.3 ppm | 3.44 |
| Fe | 1,210.0 ppm | 1,170.0 | 0.74 |
| Ni | 104.0 ppm | 1.1 ppm | 0.0032 |
| Mn | 1,160.0 ppm | 1,130.0 ppm | 0.004 |
| Cl | 3.5 ppm | — | 0.009 |
| Pb | 11.0 ppm | 2.1 ppm | 0.29 |
| Sb | <0.3 ppm | <0.03 ppm | 0.0001 |
| As | 0.66 ppm | 0.54 ppm | 0.0004 |
| Co | 4.6 ppm | 0.56 ppm | 0.006 |
| Si | 45.0 ppm | 50.0 ppm | 0.32 |
| Cd | 17.5 ppm | 0.4 ppm | 0.38 |

E. Iron Removal (Reactor 50)

After the nickel cementation, the liquor was treated with 5.34 g zinc oxide per liter. This raised the pH to about 4.0 at 88° C. (The equivalent pH at 25° C. is about 4.8) The solution was held at between 85° and 90° C. for 3 hours. The solution analyses are given in Table VI.

As shown, the iron level was reduced to 3.0 ppm, and the levels of several impurities, particularly nickel and cobalt, increased to some extent. The reason for this is not clear, but impurities in the zinc oxide used for neutralization are the most likely cause. It should be noted that the zinc dust used for nickel cementation, and the zinc oxide used for iron removal should be free of deleterious contaminants.

Table IV
Iron Removal by Addition of Zinc Oxide

| Element | Starting Liquor | Final Liquor | Residue (wt %) |
|---|---|---|---|
| Zn | 223.0 g/l | 196.0 g/l | 38.4 |
| Cu | 1.3 ppm | 2.9 ppm | 0.091 |

Table IV-continued
Iron Removal by Addition of Zinc Oxide

| Element | Starting Liquor | Final Liquor | Residue (wt %) |
|---|---|---|---|
| Fe | 1,170.0 ppm | 3.0 ppm | 15.0 |
| Ni | 1.1 ppm | 1.8 ppm | 0.0004 |
| Mn | 1,130.0 ppm | 1,000.0 ppm | 0.003 |
| Cl | — | 30.0 ppm | 0.035 |
| Pb | 2.1 ppm | 1.4 ppm | 0.056 |
| Sb | <0.03 ppm | <0.03 ppm | 0.0003 |
| As | 0.54 ppm | 0.20 ppm | 0.0008 |
| Co | 0.56 ppm | 1.8 ppm | 0.003 |
| Si | 50.0 ppm | 3.0 ppm | 0.032 |
| Cd | 0.4 ppm | 0.5 ppm | <0.001 |

ZINC ELECTROWINNING

As noted above, success in zinc electrowinning depends principally on obtaining a pure electrolyte. The presence of impurities, some in only trace amounts, can cause poor current efficiency, sticking of deposited zinc to the aluminum receptors, and rough, pitted, or spongy cathodes. A small scale zinc electrowinning apparatus was constructed in order to demonstrate that the electrolyte produced could be electrowon to produce zinc cathodes.

The cell body was constructed of clear plastic and designed to contain 4 anodes and 3 cathodes. The volume of the cell was about 2.5 liters, and the working area of each cathode face was 3.25 inches by 4.25 inches. The combined cathode area was 0.58 square feet. The cathodes were made of aluminum and the anodes of pure lead. The spacing between each electrode was one inch. A 12 volt, 50 amp, D.C. power supply with 1% regulation provided electrical current, which was monitored by an electronic coulometer. An internal heat exchanger with circulating water was used to keep the cell electrolyte at 35° C.

Electrolyte was recycled from the cell overflow using a finger pump. The recycle electrolyte which nominally contains 200 g/l sulfuric acid and 60 g/l zinc was mixed with electrolyte feed in an all-glass packed tube static mixer. The feed electrolyte which nominally contains 200 g Zn/l and essentially no acid was metered into the mixer with a precision bellows pump. The recycle flow rate and the feed flow rate were adjusted to as to produce an input electrolyte of 67 g/l zinc and 190 g/l sulfuric acid. The feed electrolyte was preheated to 35° C. in a water bath.

The results of two zinc electrowinning experiments are set forth below. Each experiment was approximately eight hours in duration, and the electrolytes used were obtained by combining purified electrolytes treated as disclosed in the leaching and purification experiments described above. Operating parameters for these two experiments are summarized in Table VII.

Table VII
Zinc Electrowinning Operating Parameters

| Parameter | 1 | 2 |
|---|---|---|
| Temperature ° C. | 35-37 | 35.5 |
| Feed rate, l/hr. | 0.274 | 0.275 |
| Recycle rate, l/hr. | 5.20 | 4.89 |
| Current density, amps/ft | 61.1 | 59.9 |
| Voltage, volts | 3.3 | 3.3 |

In experiment 1, the manganese dioxide produced on oxidation of the manganese at the anode was allowed to build up in the cell. In experiment 2, the recycle electrolyte was passed through a 10 micron filter which removed most of the suspended $MnO_2$.

Chemical analyses of the enriched electrolyte feed and of the recycle stream at the beginning and after each hour of operation are listed in Table VIII for experiment 1 and in Table IX for experiment 2.

The electrolyte used in experiment 1 met most of the specifications noted above. The nickel level was slightly high (0.9 ppm) and the manganese level was quite high (1002 ppm). However, after the feed electrolyte was mixed with recycle electrolyte, and during the course of the experiment, the manganese level was well within limits. The nickel level remained high and probably contributed to some loss in current efficiency and roughness of the cathode. The current efficiency obtained was 85.7%.

The electrolyte used in experiment 2 met all of the specifications listed above. The current efficiency of 88.7% was also higher than in the case of Experiment 1.

Table VIII
Continuous Electrowinning Experiment 1 - Electrolyte Analyses

| Sample | $H_2SO_4$ g/l | Zn g/l | Co ppm | Ni ppm | Cu ppm | Fe ppm | Mn ppm |
|---|---|---|---|---|---|---|---|
| Enriched electrolyte | — | 200 | — | 0.90 | 7.1 | 16.0 | 1002 |
| Recycle electrolyte initial | 197 | 62.4 | — | 0.24 | <5.0 | <5.0 | 303 |
| 60 min. | — | 59.2 | — | — | <5.0 | 9.3 | 85.1 |
| 91 min. | — | 62.7 | — | 0.78 | <5.0 | 6.6 | 60.3 |
| 151 min. | 199 | 62.3 | 1.2 | — | <5.0 | 7.8 | 42.4 |
| 279 min. | 205 | 60.9 | — | 0.81 | <5.0 | 8.5 | 44.6 |
| 591 min. | 212 | 60.5 | 1.1 | — | <5.0 | 8.9 | 43.5 |
| 455 min. | 214 | 59.5 | — | 0.76 | <5.0 | 9.6 | 49.4 |
| 511 min. | 214 | 58.6 | 1.2 | — | <5.0 | 9.4 | 43.4 |
| 571 min. | 219 | 58.2 | — | 0.52 | <5.0 | 9.7 | 33.7 |

Table IX
Continuous Electrowinning Experiment 2 - Electrolyte Analyses

| Sample | $H_2SO_4$ g/l | Zn g/l | Co ppm | Ni ppm | Cu ppm | Fe ppm | Mn ppm |
|---|---|---|---|---|---|---|---|
| Enriched electrolyte | — | 202 | 0.13 | 0.23 | 0.6 | 5.5 | 1015 |
| Recycle electrolyte initial | 194 | 60.8 | 0.10 | — | 0.1 | 2.3 | 292 |
| 60 min. | 194 | 61.4 | — | 0.40 | 2.0 | 2.8 | 108 |
| 120 min. | 193 | 62.9 | 0.16 | — | 2.5 | 2.9 | 57 |
| 180 min. | 195 | 66.5 | — | 0.50 | 2.6 | 3.4 | 49 |
| 240 min. | 194 | 66.4 | 0.16 | — | 2.0 | 3.2 | 42 |
| 300 min. | 196 | 67.1 | — | 0.17 | 1.8 | 3.6 | 40 |
| 360 min. | 196 | 66.8 | 0.08 | — | 1.5 | 3.5 | 37 |
| 420 min. | 197 | 67.4 | — | 0.40 | 1.2 | 3.9 | 39 |
| 480 min. | 196 | 67.4 | 0.16 | — | 1.1 | 4.0 | 40 |
| 540 min. | 197 | 67.0 | — | 0.20 | — | 4.3 | 39 |
| 600 min. | — | 67.7 | 0.16 | — | — | 4.2 | 41 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed:

1. A hydrometallurgical process for recovering copper and zinc metal from a brass mill waste product feed material containing significant quantities of oxidized copper and zinc, at least trace amounts of iron, and a metal value selected from the group consisting of nickel and cobalt, said process comprising the steps of:

A. leaching the feed material in a first reactor with an aqueous sulfuric acid leach liquor having a pH less than 2.0 and in the presence of oxygen so that leachable copper and zinc are solubilized;

B. delivering the pregnant liquor produced in step A to a second reactor together with an additional quantity of the feed material to increase the pH of the liquor by neutralization to a value between about 2.5 and 3.5;

C. recycling solids remaining in the second reactor after neutralization to the first reactor;

D. adding zinc metal to the pregnant liquor to selectively precipitate copper values by cementation;

E. separating the copper precipitate from the leach liquor;

F. adding zinc powder to the leach liquor while excluding oxygen therefrom, the zinc powder being added in stoichiometric excess sufficient to cement residual copper, nickel, cobalt, and iron present in the leach liquor, to reduce the nickel and cobalt concentration to at least about 1 mg/l;

G. increasing the pH of the copper, nickel, and cobalt barren leach liquor to precipitate iron; and H. electrowinning zinc from the leach liquor to produce cathodic zinc metal and hydrogen ions.

2. The process as set forth in claim 1 wherein step G is effected by adding ZnO to the leach liquor, an oxygen containing gas is sparged therethrough, and the iron concentration of the resulting liquor sent to the electrowinning reaction is less than 20 mg/l.

3. The process as set forth in claim 1 wherein the pH of the liquor resulting from step B is less than 3.0.

4. The process as set forth in claim 1 wherein a portion of the cathodic zinc produced in step H is shredded and used in step D.

5. The process as set forth in claim 1 wherein a zinc-barren leach liquor resulting from step H is recycled to step A.

* * * * *